US009282280B2

(12) United States Patent
Shima et al.

(10) Patent No.: US 9,282,280 B2
(45) Date of Patent: Mar. 8, 2016

(54) DIGITAL RECORDING APPARATUS AND COPYRIGHT PROTECTION METHOD THEREOF

(75) Inventors: Hisato Shima, Kanagawa (JP);
Teruyoshi Komuro, Kanagawa (JP);
Harumi Kawamura, Tokyo (JP)

(73) Assignee: Sony Corporation, Tokyo (JP)

(*) Notice: Subject to any disclaimer, the term of this patent is extended or adjusted under 35 U.S.C. 154(b) by 179 days.

(21) Appl. No.: 13/274,873

(22) Filed: Oct. 17, 2011

(65) Prior Publication Data
US 2012/0033938 A1 Feb. 9, 2012

Related U.S. Application Data

(63) Continuation of application No. 11/446,246, filed on Jun. 5, 2006, now Pat. No. 8,050,536, which is a continuation of application No. 09/518,403, filed on Mar. 3, 2000, now Pat. No. 7,221,853, which is a continuation of application No. 08/922,862, filed on Sep. 3, 1997, now Pat. No. 6,298,196.

(30) Foreign Application Priority Data

Sep. 5, 1996 (JP) .................................. 8-255464

(51) Int. Cl.
*H04N 9/80* (2006.01)
*H04N 5/913* (2006.01)

(52) U.S. Cl.
CPC ...... *H04N 5/913* (2013.01); *H04N 2005/91328* (2013.01)

(58) Field of Classification Search
CPC ................ H04N 5/913; H04N 2005/91328; H04N 5/85; H04N 9/8042; G11B 20/00086
USPC .......................................................... 386/252
See application file for complete search history.

(56) References Cited

U.S. PATENT DOCUMENTS 4,652,874 A 3/1987 Loyer
4,723,120 A 2/1988 Petty, Jr.
(Continued)

FOREIGN PATENT DOCUMENTS

DE 3151492 7/1983
EP 0371719 6/1990
(Continued)

OTHER PUBLICATIONS

D. Bursky, "Networking Scheme Exploits Existing RS-232 Interface," Electronic Design, No. 13, May 28, 1987, pp. 65, 66-68.
(Continued)

*Primary Examiner* — William C Vaughn, Jr.
*Assistant Examiner* — Daniel Tekle
(74) *Attorney, Agent, or Firm* — Oblon, McClelland, Maier & Neustadt, L.L.P.

(57) ABSTRACT

The CGMS unacceptable recorder accepts transmission frames only when the copyright protection information in a transmission header transmitted to the IEEE1394 serial bus indicates copy free. The CGMS acceptable recorder accepts transmission frames when the copyright protection information in the transmission header indicates copy free. When the copyright protection information in the transmission header indicates compliance with the copyright information contained in the content of the transmission frame, the copyright information in the content is fetched based on the signal format type information of the transmission header. As described herein above, a copy management information changeable apparatus such as a computer cannot accept data other than copy free signals from the digital interface.

11 Claims, 5 Drawing Sheets

(56) References Cited

U.S. PATENT DOCUMENTS

| | | |
|---|---|---|
| 4,903,016 A | 2/1990 | Murai et al. |
| 5,007,051 A | 4/1991 | Dolkas et al. |
| 5,420,724 A | 5/1995 | Kawamura et al. |
| 5,455,569 A | 10/1995 | Sherman et al. |
| 5,515,211 A | 5/1996 | Kawamura et al. |
| 5,539,390 A | 7/1996 | Nagano et al. |
| 5,712,834 A | 1/1998 | Nagano et al. |
| 5,729,717 A | 3/1998 | Tamada et al. |
| 5,757,909 A * | 5/1998 | Park ............... 380/201 |
| 5,761,302 A | 6/1998 | Park |
| 5,778,064 A | 7/1998 | Kori et al. |
| 5,790,876 A | 8/1998 | Shima et al. |
| 5,815,631 A | 9/1998 | Sugiyama et al. |
| 5,847,771 A | 12/1998 | Cloutier et al. |
| 5,850,573 A | 12/1998 | Wada |
| 5,887,193 A | 3/1999 | Takahashi et al. |
| 5,896,454 A * | 4/1999 | Cookson et al. ............ 360/60 |
| 5,973,748 A | 10/1999 | Horiguchi et al. |
| 5,987,126 A | 11/1999 | Okuyama et al. |
| RE37,052 E | 2/2001 | Park |
| 6,298,196 B1 | 10/2001 | Shima et al. |

FOREIGN PATENT DOCUMENTS

| | | |
|---|---|---|
| EP | 0573204 | 12/1993 |
| EP | 0626635 | 11/1994 |
| EP | 0637157 | 2/1995 |
| EP | 0727729 | 8/1996 |
| JP | 3-102676 | 4/1991 |
| JP | 4-97468 | 3/1992 |
| JP | 5-258463 | 10/1993 |
| JP | 05-266586 | 10/1993 |
| JP | 05-277633 | 10/1993 |
| JP | 7-226915 | 8/1995 |
| JP | 8-77706 | 3/1996 |
| JP | 9-284342 | 10/1997 |
| JP | 9-320193 | 12/1997 |
| JP | 2000-501875 | 2/2000 |
| JP | 3020613 | 3/2000 |
| WO | 96/07971 | 3/1996 |
| WO | WO 97/33283 | 9/1997 |
| WO | WO98/02881 | 1/1998 |

OTHER PUBLICATIONS

A. Gefrides et al., "Standard Bus Connects up to 126 Peripherals: Plug and Play with USB," Applications Connections, May 1996, pp. 36-38.

G. Hoffman et al., "IEEE 1394: A Ubiquitous Bus," IEEE, May 3, 1995, pp. 334-338.

IEEE Standard for a High Performance Serial Bus, IEEE Standard 1394, Aug. 30, 1996, pp. i-viii, 1-372.

* cited by examiner

DIGITAL RECORDING APPARATUS AND COPYRIGHT PROTECTION METHOD THEREOF

CROSS-REFERENCE TO RELATED APPLICATIONS

The present application is a continuation of U.S. application Ser. No. 11/446,246 filed Jun. 5, 2006, which is a continuation of U.S. application Ser. No. 09/518,403 filed on Mar. 3, 2000, which is a continuation of U.S. application Ser. No. 08/922,862 filed on Sep. 3, 1997, and in turn claims priority to Japanese patent application P08-255464 filed on Sep. 5, 1996, the entire contents of each of which are hereby incorporated herein by reference.

BACKGROUND OF THE INVENTION

1. Field of the Invention

This invention relates to a technique for processing copyright information in recording apparatus such as digital video cassette recorders (refer to as DVCR hereinafter) provided with a digital interface based on IEEE1394 format and computers.

2. Description of the Related Art

Commercial DVCRs which record/reproduce digitized video signals and audio signals have been commercially available. Such DVCR is provided with an interface for inputting and outputting video signals and audio signals as they are digital. Therefore, digital doubling is possible between DVCRs provided with a digital interface.

The digital interface described herein above is arranged in accordance with IEEE1394. In audio and video signal transmission protocol of IEEE1394, a digital interface transmits signals to a transparent based on the concept that transmission apparatus side and receiving side deal with copyright protection. Therefore a digital interface transmits signals without copyright information.

Content send by way of a digital interface is divided into two main classes, namely dynamic image signals and other signals (such as computer data and programs). It is required to manage copyright in all apparatus including computers in the case of dynamic image signals. However, in the case of an apparatus such as a computer in which data are writable using a software, copy management information itself can be rewritten.

The present invention has been accomplished in view of such problem, it is the object of the present invention to provide a method for protecting copyright in which an apparatus capable of rewriting copy management information such as a computer can not accept signals other than copy free signals.

In order to solve the above-mentioned problem, the method for copyright protection in accordance with the present invention is the copyright protection method of digital signal to be inputted to a digital recording apparatus provided with a digital interface, in a header of a transmission frame of the digital signal to be transmitted a copyright protection information is contained, the copyright protection information restricts recording of the digital signal to be inputted to the digital recording apparatus, wherein the copyright protection information includes the copy free information for indicating the digital recording apparatus that the digital signal is copy free, and the information for indicating the digital recording apparatus so that the digital recording apparatus performs copy management in compliance with the copyright information included in the content of the transmitted transmission frame.

A medium in accordance with the present invention is the medium which receives a content including digital signal for performing copyright protection, in a header of a transmission frame of the digital signal to be transmitted a copyright protection information is contained, and the copyright protection information restricts recording of the digital signal to be inputted to the digital recording apparatus, wherein the copyright protection information includes the copy free information for indicating the digital recording apparatus that the digital signal is copy free, and the information for indicating the digital recording apparatus so that the digital recording apparatus performs copy management in compliance with the copyright information included in the content of the transmitted transmission frame.

The digital recording apparatus in accordance with the present invention is the digital recording apparatus provided with a digital interface, wherein the digital recording apparatus has a means for detecting the copyright protection information provided in a transmission header of a transmission frame of a digital signal inputted through the digital interface, and a means for taking in the transmission frame and for allowing recording processing if the copyright protection information indicates copy free of the digital signal.

The control IC in accordance with the present invention is the control IC for controlling a link layer of a digital interface mounted on a digital recording apparatus provided with the digital interface, wherein the control IC has a means for detecting the copyright protection information provided in a transmission header of a transmission frame of a digital signal inputted through the digital interface, and a means for taking in the transmission frame and for indicating recording processing to the digital recording apparatus if the copyright protection information indicates copy free of the digital signal.

According to the present invention, a recording apparatus which does not perform processing in compliance with the copyright information with a hardware accepts transmission frames only when the copyright protection information in a transmission header indicates copy free. A recording apparatus which performs processing in compliance with the copyright information with a hardware which accepts transmission frames when the copyright protection information in the transmission header indicates copy free, and when the copyright protection information in the transmission header indicates compliance with the copyright information contained in the content of the transmission frame, the copyright information in the content is fetched based on the signal format type information of the transmission header.

BRIEF DESCRIPTION OF THE DRAWINGS

FIGS. 3A and 3B are diagrams for illustrating format of a CIP header.

DETAILED DESCRIPTION OF THE PREFERRED EMBODIMENTS

Embodiments of the present invention will be described in detail hereinafter with reference to the drawings.

The present invention addresses on the content (for example, software such as movie pictures and programs transmitted from satellite broadcasts, and software reproduced from media such as video tapes and video disks sold as rental video and video software.) which controls copyright information according to CGMS-D (Copy Generation Management System-Digital) system. An apparatus which can perform copyright protection management based on the management information defined by way of the CGMS-D system is referred to as CGMS acceptable apparatus, and an apparatus which has no function of copyright protection management is referred to as CGMS-D unacceptable apparatus.

The CGMS-D system indicates copyright management condition using three codes. "00" indicates that the content is copy free, "11" indicates that the content is not copy free, and "10" indicates that the content can be copied only once.

The CGMS acceptable apparatus performs the processing "do not record if the apparatus detects that the content intended to be recorded is dynamic image signals and not allowed to be copied" using the above-mentioned code "00" by means of the hardware provided in the apparatus. The CGMS acceptable apparatus performs the processing "flag is changed to no copy flag and recording is performed if the apparatus detects that the content intended to be recorded is dynamic image signals and allowed to be copied once" using the above-mentioned code "10".

The CGMS unacceptable apparatus does not have a function to perform such processing. The apparatus which does not check the CGMS code by itself but an built-in driver software checks the CGMS code is not included in the category of CGMS acceptable apparatus. In other words, an apparatus in which the response to the CGMS is changeable dependently on a software such as a computer is categorized to the CGMS unacceptable apparatus.

Figure 1:
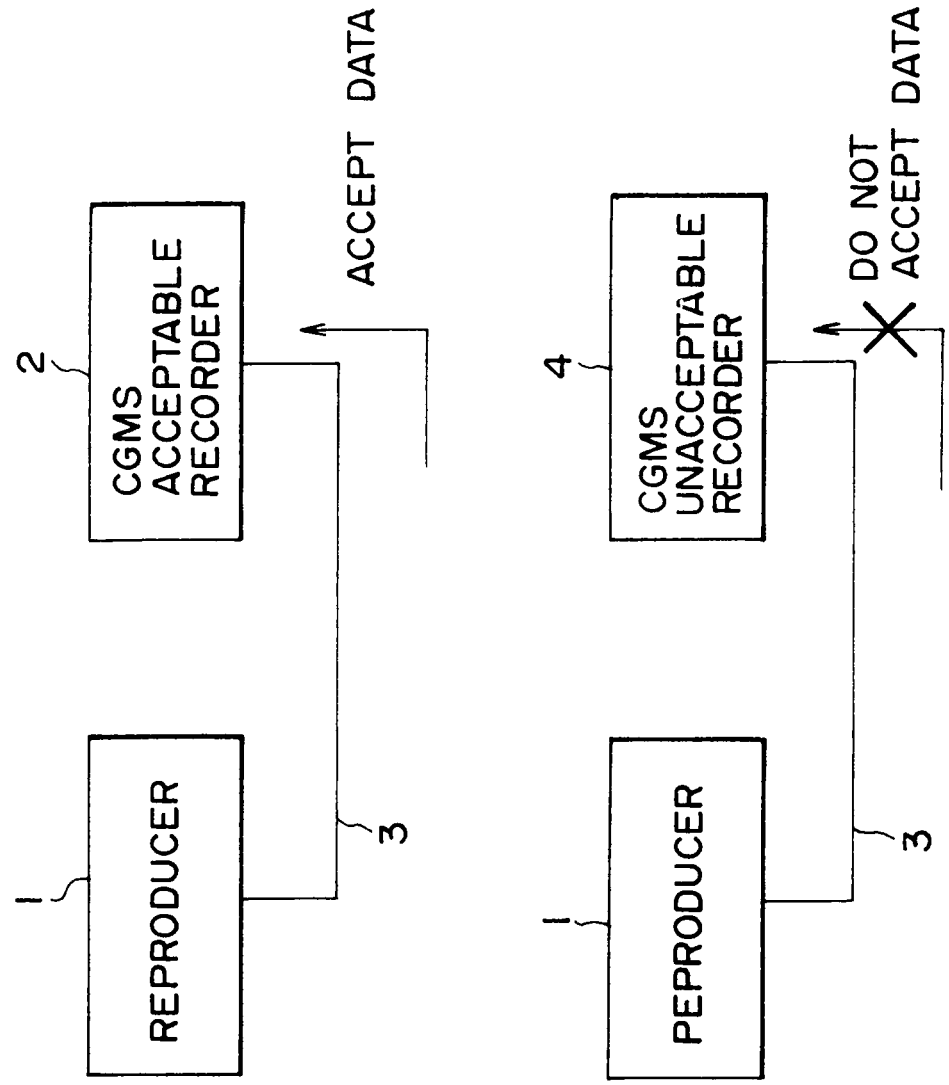
FIG. 1A and FIG. 1B are diagrams for illustrating the operation of a system to which the present invention is applied.

The operation of a system to which the present invention is applied is shown in FIGS. 1A and 1B. FIG. 1A shows a combination of a reproducer 1 and a CGMS acceptable recorder 2 connected with IEEE1394 serial bus 3, and FIG. 1B is a combination of a reproducer 1 and a CGMS unacceptable recorder 4 connected with IEEE1394 serial bus. Herein, the reproducer includes not only a DVCR described herein above but also a digital television tuner and digital television receiver having function to receive digital television broadcast and output digital video signals and digital audio signals to IEEE1394 serial bus.

As shown in FIG. 1A, in the case that the recorder is CGMS acceptable, the transmitted signal can be accepted, and on the other hand, in the case that the recorder is CGMS unacceptable as shown in FIG. 1B, the transmitted signal can not be accepted by the digital interface (herein, IEEE1394 interface) though the signal in FIG. 1B is the same as the signal in FIG. 1A.

Figure 2:
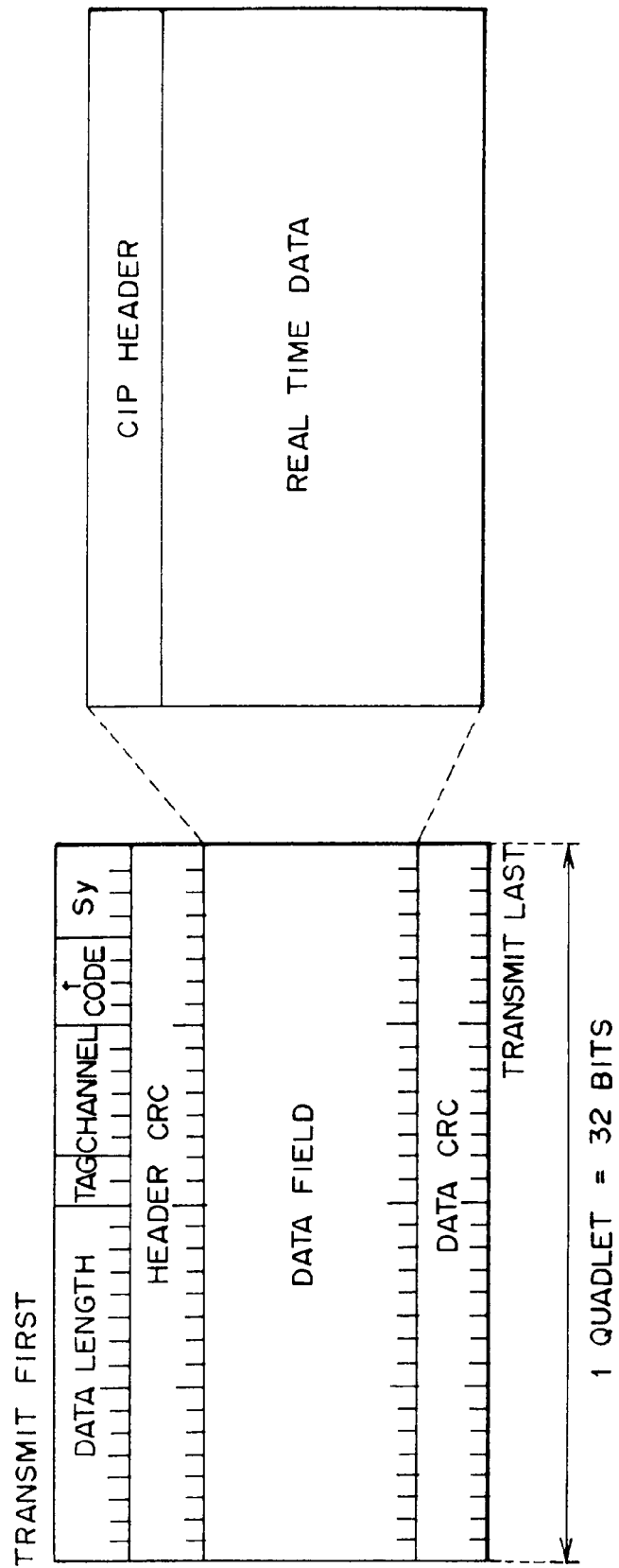
FIG. 2 is a diagram for illustrating the structure of the isochronous packet.
Figures 3A, 3B:
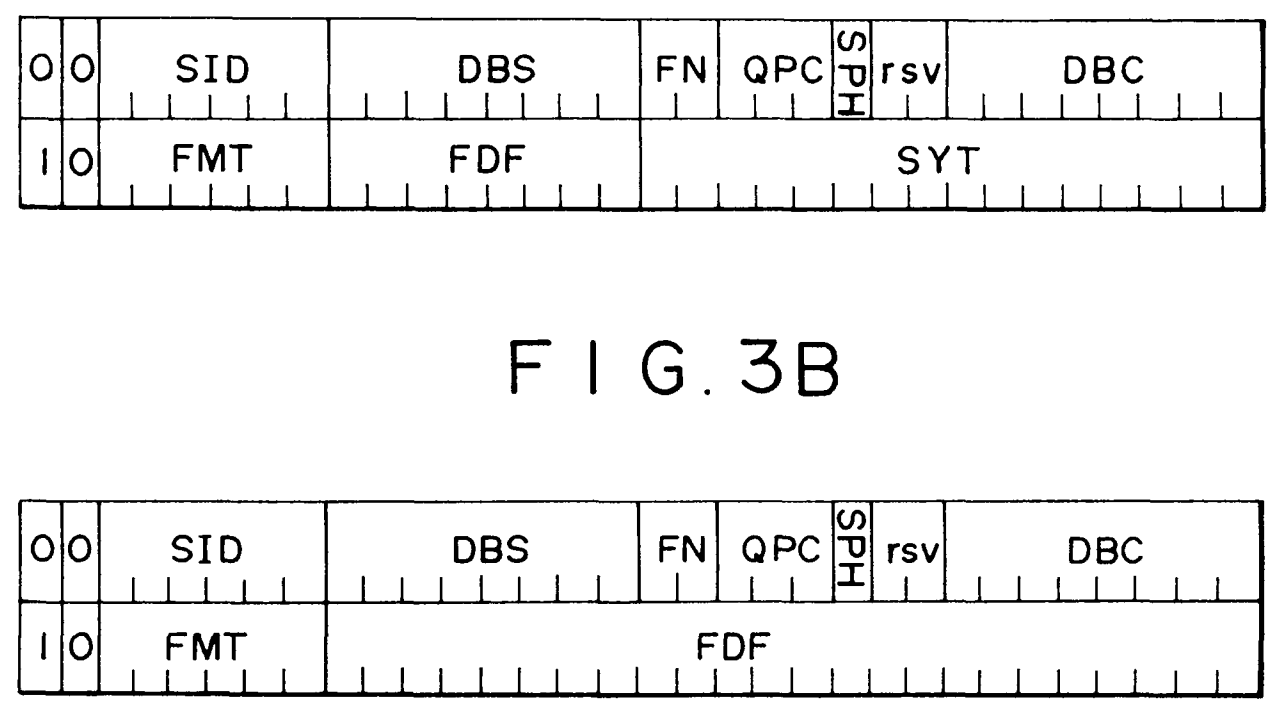

A transmission frame (isochronous packet) transmitted to IEEE1394 serial bus has the structure as shown in FIG. 2, in the case that real time data such as digital audio signals or digital video signals are transmitted, a header referred to as CIP header is added. The format of a CIP header is shown in FIGS. 3A and 3B. FIG. 3A shows a CIP header with a time sump (SYT) and FIG. 3B shows a CIP header without a time sump (SYT).

In this embodiment, copyright protection information is added to the digital video signal having the isochronous packet type structure using the reserved area (rsv) (2 bits) of a CIP header as described in (1) and (2) herein under in detail.

(1) A bit which indicates copy free and flag of CGMS-D contained in the content are detected, and a bit which indicates that the recording apparatus should follow the indication is assigned respectively.

(2) Only 1 bit is used, and 0 indicates copy free and 1 indicates that a flag of the CGMS-D in the content is detected and an indication that the apparatus should perform in compliance with the indication is given to the recording apparatus.

In detail, in the case that the recorder is a CGMS acceptable apparatus, if the bit of the reserved area of the CIP header is a bit which is in the condition that indicates copy free, the recorder accepts the data of the content as it is. A flag of CGMS-D is detected, and If the flag is a flag which is in the condition that indicates compliance with the CGMS-D, the recording apparatus accepts the flag of CGMS-D and performs processing of the copy management in compliance with the CGMS-D. Herein, because location where a flag of CGMS is contained is different depending on the type of the signal transmitted on the IEEE1394 serial bus, the type of the signal is judged based on the FMT (format field) of the CIP header and the location of the flag is confirmed. For example, a flag of a CGMS is located in a VAUX (video auxiliary data) in the case of reproduction signals of DVCR (SD, HD), differently, a flag of a CGMS is located in a PES header in the case of receiving signal of digital broadcast such as DirecTV and DVB.

A recorder that is a CGMS unacceptable apparatus accepts it as it is if the bit of the reserved area of a CIP header is a bit which is in the condition that indicates copy free. The recorder does not accept the input data content if the flag of CGMS-D is detected, and the flag is a flag which is in the condition that indicates the recording apparatus to perform compliance with CGMS-D.

In both cases of a CGMS acceptable apparatus and CGMS unacceptable apparatus, the hardware of link layer control IC of the IEEE1394 interface performs the above-mentioned processing. In other words, copyright protection is performed by the digital interface using the link layer control IC for a CGMS acceptable apparatus or using the link layer control IC for a CGMS unacceptable apparatus.

Figure 4:
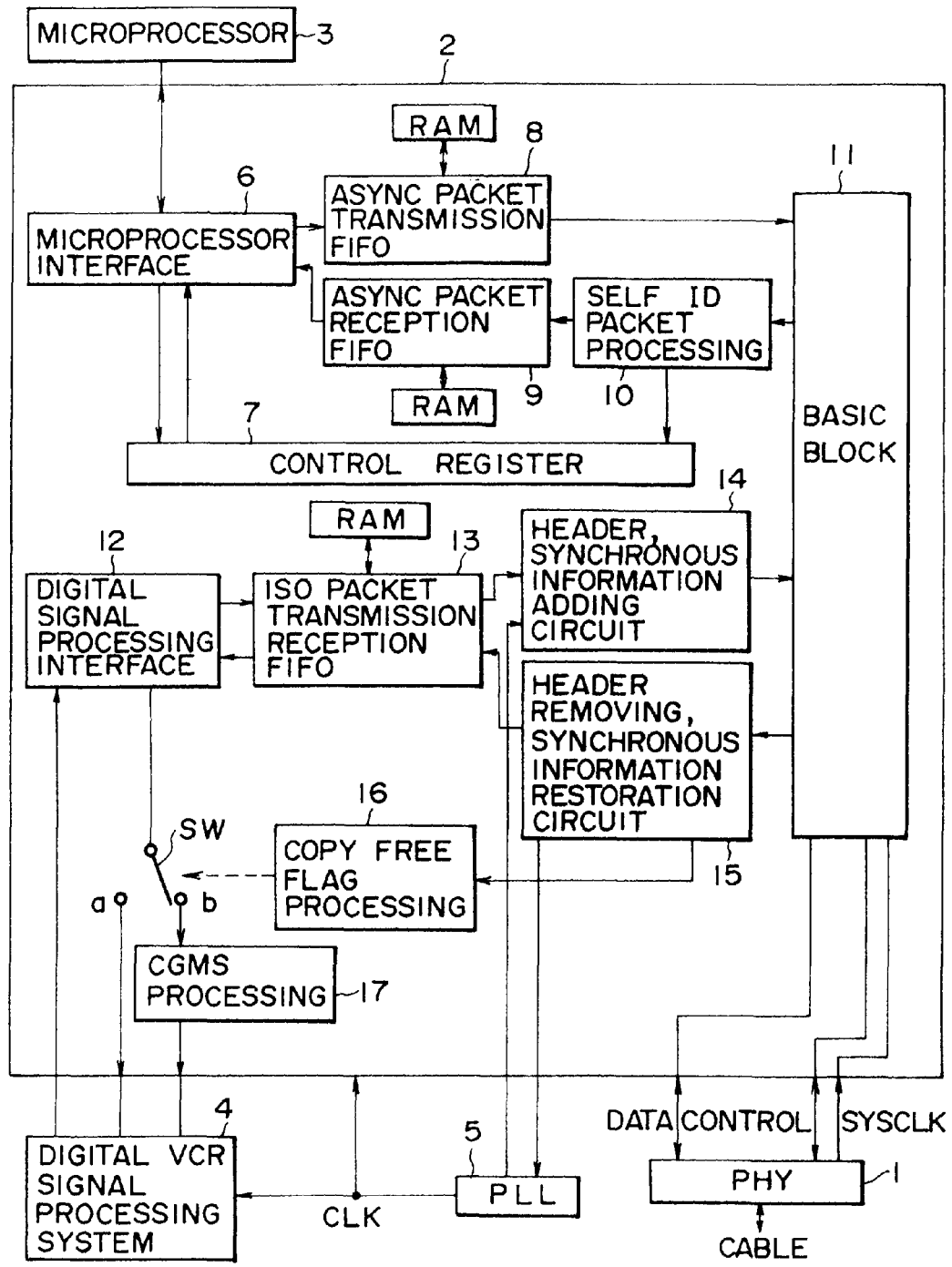
FIG. 4 is a diagram for illustrating the internal structure of a DVCR which is a CGMS acceptable apparatus including LINC and peripheral components.

FIG. 4 shows the internal structure of a DVCR which is a CGMS acceptable apparatus including a link layer control IC (refer to as LINC hereinafter) with peripheral components. The DVCR is provided with a physical layer control IC (refer to as PHY hereinafter) 1, a LINC 2, a microprocessor 3, a digital VCR signal processor 4, and PLL 5.

PHY 1 performs initialization of the bus and conciliation of usufructuary right. PHY 1 communicates data such as digital video signals and various control signals (control) with LINC 2, and transmits these data and control signals to the cable. Further PHY 1 supplies a system clock (sysclk) to LINC 2. Details of LINC 2 is described hereinafter. The microprocessor 3 performs control of PHY 1 and LINC 2 and acquisition of isochronous communication band. The digital VCR signal processor 4 records/reproduces digital video signals and digital audio signals. PLL 5 receives frame synchronizing information from LINC 2 and generates clock signals (clk), and supplies them to LINC 2 and the digital VCR signal processor 4.

The internal of LINC 2 is divided to three main blocks of isochronous system, asynchronous system, and basic block. The isochronous system is a block for generating and analyzing isochronous packets on which data such as digital video signals are loaded, and the asynchronous system is a block for generating and analyzing asynchronous packets on which control signals such as commands for controlling apparatus are loaded.

The asynchronous system comprises a microprocessor interface 6, control resistor 7, asynchronous packet transmission FIFO 8, asynchronous packet receiving FIFO 9, and self ID packet processing block 10.

Basic block 11 is provided with a clock, CRC, physical interface, transmission block, and receiving block.

The isochronous system comprises a digital signal processing interface 12, isochronous packet transmission receiving FIFO 13, header and synchronous information adding circuit 14, header removing and synchronous information restoration circuit 15, copy free flag processing block 16, CGMS processing block 17, and switch SW.

The microprocessor interface 6 transmits to and receives from the microprocessor 3 the data corresponding to the request from the high order layer.

The microprocessor 3 writes data in the control resistor 7 at the predetermined position to control the operation of LINC 2. While asynchronous packets are transmitted or received, this operation is performed by reading or writing the predetermined address. Further, the partial header of the isochronous packet is transmitted or received through this resistor.

The asynchronous packet transmission FIFO 8 stores temporarily the packet generated by the microprocessor 3. The stored packet is read by the basic block 11 immediately when the bus becomes free.

The basic block 11 writes the packet transferred from the bus in the asynchronous packet receiving FIFO 9. The microprocessor 3 reads it after confirming that the this FIFO is not free.

The self ID packet processing block 10 performs processing of node information received during initialization of the bus, and detects the number of nodes connected to the bus and the node that controls the isochronous channel of the bus.

The physical interface of the basic block 11 performs parallel/serial conversion of transmission data and serial/parallel conversion of reception data. The transmission block judges condition of the bus, and controls transmission of the packet. The reception block determines a component to be written depending on the type of the received packet (asynchronous or isochronous).

The digital signal processing interface 12 converts data of the digital VCR signal processing system 4 to data of the isochronous packet format while transmitting, and converts inversely while receiving.

The isochronous packet transmission reception FIFO 3 is a FIFO which functions also to transmit/receive an isochronous packet, the packet is read by the basic block 11 as long as the packet is read while transmitting, and the packet is written as long as the FIFO does not overflow while receiving.

The header and synchronous information adding circuit 14 writes the information specified by the IEEE1394 in the header portion (before the data field in FIG. 2). Further the header and synchronous information adding circuit 14 digitizes the frame synchronous signal of a video signal to be transmitted based on the clock in the basic block 11, and writes it in a specified packet.

The header removing synchronous information restoration circuit 15 removes information from the header, thereafter writes only data in the isochronous packet transmission reception FIFO 3. Further, the header removing synchronous information restoration circuit 15 transmits the bit in the reserved area in a CIP header to the copy free flag processing block 16. Further, the header removing synchronous information restoration circuit 15 restores the frame synchronous signal from the digitized frame synchronous information written in a specified packet based on the clock in the basic block 11.

The copy free flag processing block 16 switches the switch SW to the terminal-a side if the bit in the reserved area received from the header removing and synchronous information restoration circuit 15 indicates free copy, and switches to the terminal-b side if the flag is detected and the flag indicates compliance with the CGMS-D.

The CGMS processing block 17 separates FMT in a CIP header from a digital video signal which is outputted from the digital signal processing interface 12 and inputted through the switch SW, and sends it with the digital video signal and digital audio signal to the digital VCR signal processing system 4.

Therefore, if the bit of the reserved area in a CIP header indicates compliance with the CGMS-D with reference to the flag of CGMS-D, a digital video signal and digital audio signal are supplied from the digital signal processing interface 12 to the digital VCR signal processing system 4, and FMT is supplied from the CGMS processing block 17. The digital VCR signal processing system 4 identifies the location where the CGMS flag is located based on FMT (which is VAUX data if it is a reproduction signal of DVCR, and which is PES header if it is a digital television broadcast signal), and performs recording processing according to the CGMS flag.

To the contrary, if the bit of the reserved area in the CIP header indicates copy free, only the digital video signal and digital audio signal are supplied from the digital signal processing interface 12 to the digital VCR signal processing system 4, and the digital VCR signal processing system 4 performs recording processing as it is.

Figure 5:
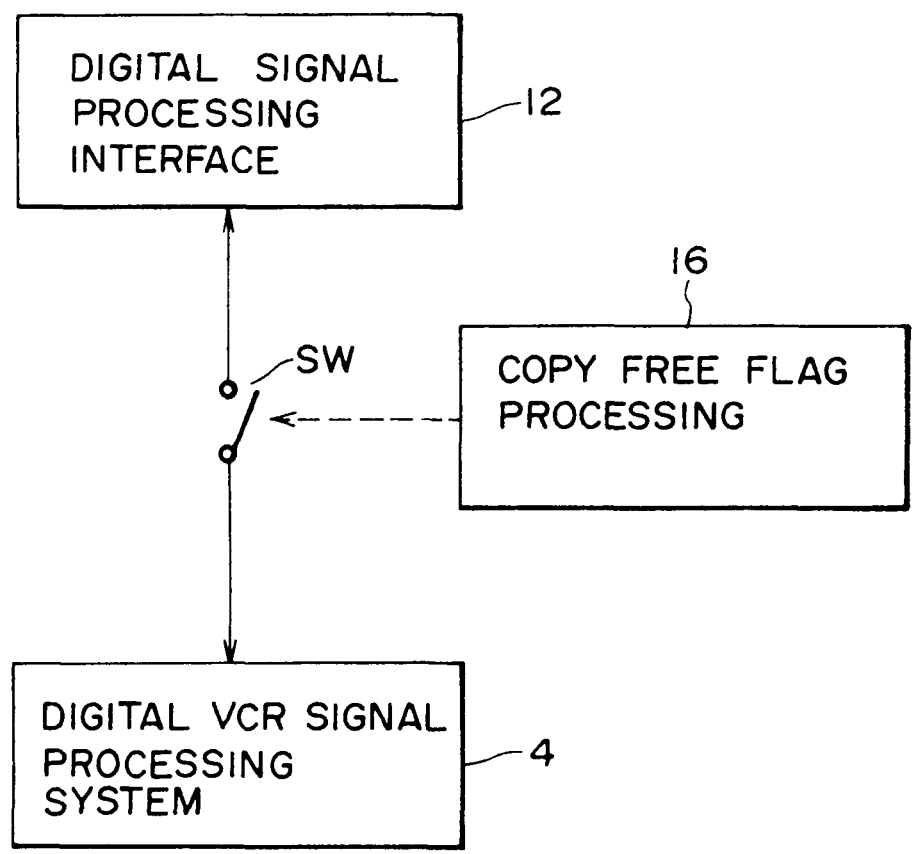
FIG. 5 is a diagram for illustrating an ON-OFF switch portion actuated in response to the control performed by a copy free flag processing block for CGMS unacceptable apparatus.

The CGMS acceptable apparatus is described hereinbefore with reference to FIG. 4. On the other hand, the CGMS processing block 17 is removed from FIG. 4, the signal line between the digital signal processing interface 12 and digital VCR signal processing system 4 is changed to a two-way signal line, and a switch SW which is turned ON/OFF by the copy free flag processing block 16 is provided on the two-way signal line, and thereby a CGMS unacceptable apparatus is structured. (FIG. 5)

In the above-mentioned embodiments, copyright protection information is provided in rsv area of a CIP header, however it is possible to provide copyright protection information in an area other than rsv area (for example, sy area in a header information)

As described hereinbefore, according to the present invention only the apparatus which performs correct copy management can accept and record signals from the digital interface.

The invention claimed is:

1. A copy protection device comprising:
   circuitry configured to receive content including a packet;
   copy free flag processing circuitry configured to detect header information including copy control information in a two bit reserved area of a header of the packet,
   copy management system processing circuitry configured to detect a one-bit flag of a copy management system in a data field in the content, the one-bit flag indicating the copy protection device is in compliance with a copy management system,
   circuitry configured to (1) produce data in the packet if the copy control information from the copy free flag processing circuitry specifies copy free and if the circuitry is a copy management system acceptable apparatus and the one-bit flag detected by the copy management system processing circuitry indicates compliance with the copy management system, and (2) if the circuitry is a copy management system unacceptable apparatus, not accept the received content if the flag of the copy management system is detected by the copy management system processing circuitry.

2. A copy protection device according to claim 1, further comprising circuitry further configured to store the data in a storage unit selected according to a type of the data.

3. A copy protection device according to claim 1, wherein the circuitry configured to receive content includes an interface connected to a processor.

4. A copy protection device according to claim 1, wherein the data is video data.

5. A copy protection device according to claim 2, wherein the circuitry configured to receive content includes a RAM and a PLL.

6. A copy protection method comprising:
receiving content including a packet;
detecting, by copy free flag processing circuitry, header information including copy control information in a two bit reserved area of a header of the packet;
detecting, by copy management system processing circuitry, a one-bit flag of a copy management system in a data field in the content, the one-bit flag indicating the copy protection device is in compliance with a copy management system;
reproducing data in the packet if the copy control information from the copy free flag processing circuitry specifies copy free and if the circuitry is a copy management system acceptable apparatus and the flag detected by the copy management system processing circuitry indicates compliance with the copy management system; and
if the circuitry is a copy management system unacceptable apparatus, not accept the received content if the flag of the copy management system is detected by the copy management system processing circuitry.

7. A copy protection method according to claim 6, further comprising
storing the data in a storage unit selected according to a type of the data.

8. A copy protection method according to claim 6, further comprising
output data via an interface connected to a processor.

9. A copy protection method according to claim 6, wherein the data is video data.

10. A copy protection method according to claim 6, further comprising
synchronizing between a plurality of devices.

11. A copy protection device comprising:
receiving means for receiving content including a packet;
copy free flag processing means for detecting header information including copy control information in a two bit reserved area of a header of the packet;
copy management system processing means for detecting a one-bit flag of a copy management system in a data field in the content, the flag indicating the copy protection device is in compliance with a copy management system;
reproducing means for reproducing data in the packet if the copy control information detected by copy free flag processing means specifies copy free and if the circuitry is a copy management system acceptable apparatus and the flag detected by copy management system processing means indicates compliance with the copy management system; and
the reproducing means not accepting the content if the circuitry is a copy management system unacceptable apparatus and if the flag of the copy management system is detected by the copy management system processing means.

* * * * *